Feb. 13, 1968 G. W. BARNETT 3,368,389
METHOD OF DETERMINING PERCENT SOLIDS IN A SATURATED SOLUTION
Original Filed July 24, 1961 2 Sheets-Sheet 1

Inventor
Glenroy W. Barnett
By Anthony D. Cennamo
Attorney

Inventor
Glenroy W. Barnett

United States Patent Office 3,368,389
Patented Feb. 13, 1968

3,368,389
METHOD OF DETERMINING PERCENT SOLIDS IN A SATURATED SOLUTION
Glenroy W. Barnett, Dublin, Ohio, assignor to Industrial Nucleonics Corporation, a corporation of Ohio
Continuation of application Ser. No. 126,155, July 24, 1961. This application May 28, 1964, Ser. No. 371,883
8 Claims. (Cl. 73—53)

This is a continuation of my copending application Ser. No. 126,155, filed July 24, 1961, for "Measuring System," now abandoned.

This invention relates generally to a method for performing density measurements and more particularly it relates to a penetration radiation density gauge for determining the percent of solids in solid form in a liquid in which the solid is soluble.

In many chemical processes a solution of some soluble material in a solvent liquid is processed through a stage in which the solids in solution crystallize out of the solution and are present as solid particles. For example, in a saturated solution of a salt or other compound, the concentration of the solution by boiling or other means beyond the saturation point results in crystals forming as the solid material in solution crystalizes out to maintain the liquid solution in saturation. If the density of such a mixture of solution and crystals is measured using a conventional radiation density gauge device, a reading will be obtained which indicates the composite effect of the density of the solution containing dissolved solid material and the presence of a certain percentage by weight in the liquid of solid crystalline material. Whenever it is necessary to measure the actual percent of crystals present in a mixture such density measurements are of little value. Prior arrangements for measuring the percent of solids in such a liquid carrier have required two density measurements one of the density of the composite mixture of crystalline solid carried in the saturated solution, as previously described, and a second measurement made of the solution alone after the solid material has been removed by filtering or other means. The difference in these two density measurements could be presented on an indicator calibrated to show percent solids. This arrangement has obvious disadvantages such as requiring two density measuring devices as well as the fact that the final result is not obtained from the original liquid but only after the liquid has been processed to remove the solids therein.

The difficulty in achieving the true measure of the percent solids present in the mixture derives from the fact that the solubility of the solid in the liquid varies with temperature and hence at different tempertaures the liquid itself with the solid in solution therein will have a varying density. Hence the density of the solution will change for different temperatures and a constant correction cannot be made to the density measurement of the mixture of solution and solids.

The present invention overcomes this difficulty by providing an improved measurement method for making the measurement which compensates the indication obtained in accordance with the temperature of the solution as established by previous measurements thereof, thereby giving the density of saturated solutions as a function of temperature. This arrangement permits a single density measurement of a solution containing crystallized solids and a measurement of the temperature of such a solution to produce an indication which can be accurately calibrated in percent solids irrespective of the temperature at which the measurements are conducted.

It is acordingly the primary object of the present invention to provide an improved method for measuring the relative concentration of solids in a saturated solution of the solid in a liquid.

A further object of the invention is to provide an improved compensating circuit for modifying the indication obtained from a density gauge in accordance with temperature to indicate percent solids in a liquid.

These and other objects of the invention will be apparent from the following detailed description taken in conjunction with the accompanying drawings wherein.

Figure 1:
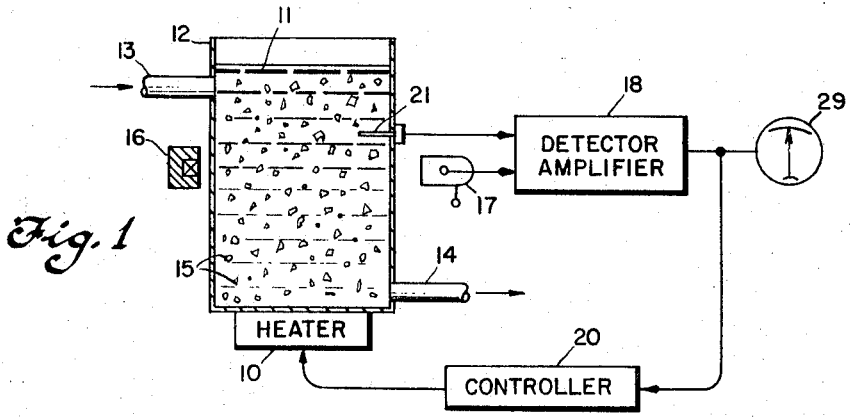
FIG. 1 is a schematic representation of a measurement system employing the invention.
Figure 3:
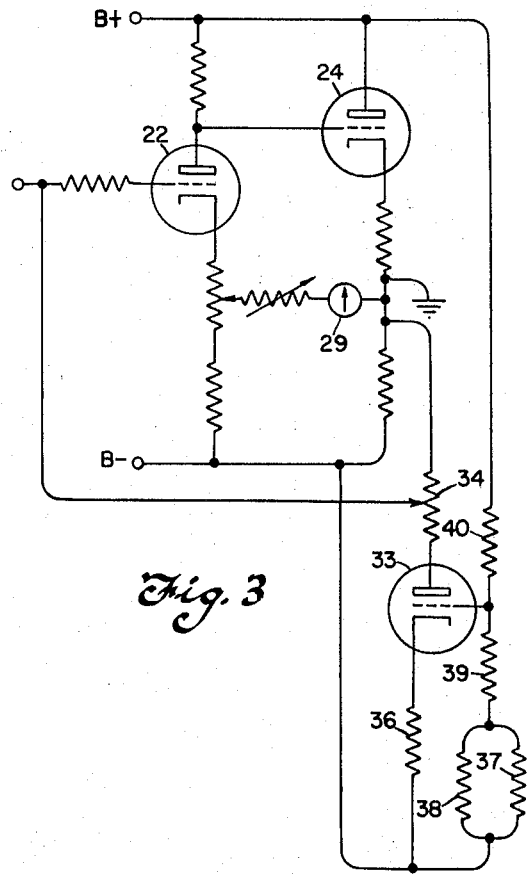
Figure 4:
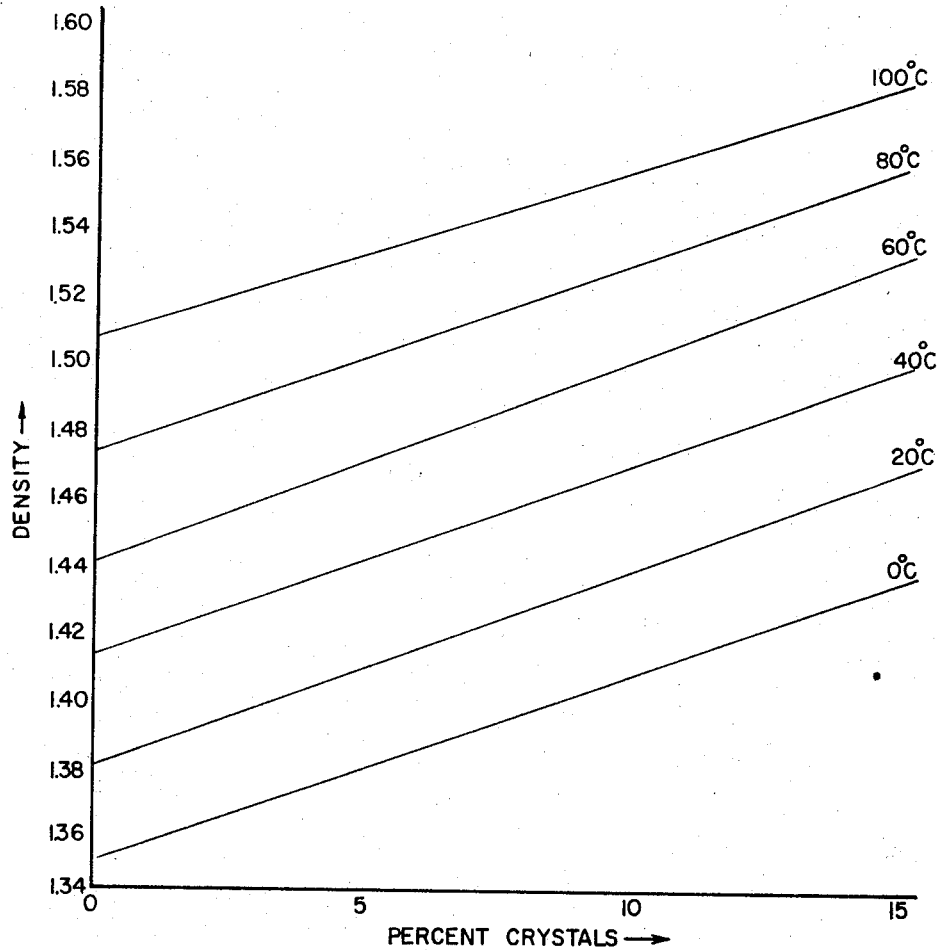

FIG. 3 is a schematic wiring diagram of a preferred form of measuring circuit; and FIG. 4 is a family of curves showing the relationship of the variables involved for one particular salt solution Referring now to FIG. 1 the invention may be applied to any process involving a liquid 11 which may be contained in a suitable container 12 or be passing through a process step in which it is arranged to flow into the container 12 through an inlet passage 13 and an outlet passage 14. The solution 11 upon reaching saturation crystallizes out solid particles 15 the measurement of which in terms of percentage in a liquid is accomplished by the present invention.

The single density measurement performed in accordance with the invention may use conventional radiation density gauge techniques which employ a source 16 of gamma rays, X-rays, or other suitable radiant energy. The rays which pass through the solution 11 and the particles 15 contained therein are detected by a detector 17 in conventional manner to produce a signal in accordance with the absorption in the path between the source 16 and detector 17 and hence representative of the density of the material in that path. Any suitable density measuring apparatus may be employed for this purpose and the various arrangements of measurement circuits and disposition of the source and detector on opposite sides of the material path may be in accordance with standard practice in the density measuring art. The signal from the detector 17 is applied to an amplifier device 18 to produce an indication on an indicator 29 in accordance with the signals detected by the detector 17.

In accordance with the invention a temperature sensor 21 is provided to sense the temperature of the solution 11 and produce a change in an electrical quantity which can be used in the detector amplifier 18 to modify the reading on the indicator 29. The device 21 may be of any suitable character but conventionally takes the form of a thermistor which is a resistance element having a resistance characteristic that varies in accordance with the temperature. Such elements may either have positive or negative temperature coefficients and the choice of the particular element will be determined by the circuit in which the thermistor is placed to compensate the indication obtained.

If desired the compensated signal applied to indicator 29 can also be applied as an input to an automatic controller 20 which may be arranged to operate in known manner to control some variable of the process such as the temperature of the solution 11. For this purpose the controller 20 is shown operating to control a heater 10 to maintain a predetermined condition of the liquid 11.

Figure 2:
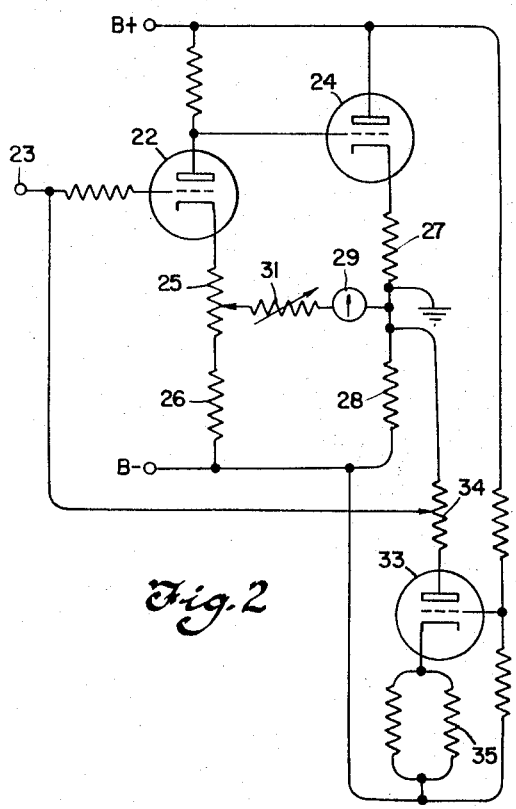
FIG. 2 is a schematic wiring diagram of one form of compensated measuring circuit.

Referring now to FIG. 2, one form of measurement circuit is shown in which an electrometer tube 22 has a grid input signal from terminal 23 derived from the detector 17. The output from the plate electrode of the tube 22 is directly coupled to the grid of a cathode follower 24. The cathode circuits of the tubes 22 and 24 have resistors 25, 26, 27 and 28 which form a bridge circuit between which a meter 29 is connected with an appropriate multiplier 31. The meter 29 indicates the quantity measured by the circuit.

This arrangement of FIG. 2 ordinarily has a bucking circuit associated therewith including the tube 33 whereby a signal in opposition to that at input electrode 23 is provided from a potentiometer 34 in the plate circuit of tube 33. The tube 33 normally has a fixed grid potential and the adjustment of the tap on the potentiometer 34 provides a zeroing adjusting for the meter 29. In order to compensate for temperature variations in the solution, for the reasons outlined hereinabove, the cathode circuit of the tube 33 may include a thermistor 35 which is physically located in the temperature sensor probe 21, FIG. 1. Thermistor 35 varies the overall cathode resistance and hence the operating bias on the tube 35 by an amount sufficient to compensate for changes in the indication on meter 29 resulting from temperature changes sensed by the thermistor.

In the circuit of FIG. 2 the resistor 35 is required to be a positive temperature coefficient resistor having sufficient slope for its resistance-temperature characteristic to produce the desired change in the indication of meter 29. Since positive temperature coefficient resistors are not as readily obtainable as negative coefficient resistors an alternative preferred circuit is shown in FIG. 3.

The circuit of FIG. 3 is generally similar to that of FIG. 2 and corresponding parts have been given like reference numbers throughout. The changes which have been made are in the circuit of the compensating tube 33 wherein a fixed cathode resistor 36 is provided having a substantially zero temperature coefficient as do the other resistors in the circuit except those specifically so designated as having a non-zero temperature coefficient. To obtain the compensation required, the grid circuit of the tube 33 in FIG. 3 compromises a voltage divider 38, 39, 40 connected between the positive and negative D.C. supply. The grid of tube 33 is connected to an intermediate point on the voltage divider. The resistor 38 is shunted by a negative temperature coefficient thermistor 37. The thermistor 37 is preferably enclosed in a suitable housing to be placed directly in the environment the temperature of which is to be monitored. Thus the thermistor 37 will be located as the temperature sensor 21 in FIG. 1 for responding to the temperature of the liquid 11. Since the resistor 37 is in the grid circuit of the tube 33 the overall effect at the tap of potentiometer 34 will be opposite to that which would be produced with the same temperature coefficient resistor in the cathode circuit. In addition, the gain of the tube 33 is effective to amplify the change produced in the thermistor 37 due to temperature and accordingly a suitable correction factor for such changes can be selected at the tap of the potentiometer 34 for modifying by the necessary amount the indication given by the meter 29.

The amount by which the indication on meter 29 is modified by the thermistor 37 will of necessity have to be determined for each particular substance which is to be measured. For this purpose the relation between the specific gravity of the saturated solution containing the crystals, the percent of crystal solids in the mixture and the temperature of the mixture must be determined. Once this relation is determined the appropriate temperature coefficient for the resistor 37 can be selected and the instrument calibrated to produce the desired result.

As a specific example of the relation between the aforementioned variables FIG. 4 shows a family of curves in which density is plotted as a function of percent crystals in the solution with temperature as a parameter. Thus for any density and any temperature the weight of the crystals in percent can be determined. Since the density gauge produces a signal proportional to the density of the solution, and since the temperature is sensed in accordance with the invention by the sensor 21, two of the variables of FIG. 4 are present as inputs to the measuring system and accordingly the indication produced on meter 29 can be calibrated to read directly in percent by weight of the crystals therein.

As an example of the utility of the present invention the following specific values will be considered for the saturated solution of $NaNO_3$ plotted in FIG. 4. In a process which normally operates at 60° C. with a concentration of 7% crystals a density reading of 1.48 would be obtained from a normal density gauge and this input to the circuit of the present invention along with the 60° C. environment for the temperature sensor would be calibrated to produce the reading of 7% crystals. If the density were to increase to 1.51 without a change in temperature the corresponding point on the 60° C. curve of FIG. 4 would indicate that the crystal concentration had increased to 12%. If, however, the density remained at 1.48 so that no change in the signal input from the detector 17 occurs when there is no change in density, this change from 7% to 12% must be produced as an indication on the meter 29 by the thermistor in the circuit such as the thermistor 37 in the circuit of FIG. 3. An appropriate slope for the temperature coefficient characteristic of the thermistor 37 can be selected to produce this change. Since the relations among the variables are substantially linear, the calibration of the system can be readily effected for a substantial range of values. In any instances where the relation between the variables involved is not linear over the operating range of the process being measured suitably shaped electrical compensation characteristics can be provided as a function of temperature by various means known in the art.

Although a particular arrangement for producing a temperature compensated measurement as applied to a specific process has been described, it will be appreciated that the invention is capable of broad application wherever variations in temperature produce a change in specific gravity of a solution which, using the prior art measurements, could not be readily distinguished from the change in specific gravity resulting from the change in the actual solids present in the solution. Accordingly the invention is to be considered to include the various arrangements which can be devised for achieving this result which may differ considerably from that of the disclosed apparatus embodiment and also to include the method when performed by equivalent apparatus or non-equivalent apparatus.

I claim:

1. The method of determining in a variable temperature environment the concentration of solids in a mixture of said solids and a saturated solution of said solids, the density of said saturated solution increasing with the temperature of said mixture, said method comprising the steps of:

passing a beam of radiation through said mixture, detecting said radiation passing through said mixture to provide a first signal having a first component that is a function of said solids concentration and a second component that is a function of said saturation solution density, sensing the temperature of said mixture to provide a second signal that is a function of the density of said mixture, and combining said second signal with said first signal to provide a third signal that is a function only of the concentration of said solids in said mixture.

2. The method of regulating the concentration of solids in a mixture of said solids and a saturated solution of said solids, the density of said saturated solution increasing with the temperature of said mixture, said method comprising the steps of:

passing a beam of radiation through said mixture, detecting said radiation passing through said mixture to provide a first signal having a first component that is a function of said solids concentration and a second component that is a function of said saturation solution density, sensing the temperature of said mixture to provide a second signal that is a function of the density of said mixture, combining said second signal with said first signal to provide a third signal that is a function only of the concentration of said solids in said mixture, and controlling the temperature of said mixture in accordance with said third signal to maintain a predetermined condition of said mixture.

3. The method of determining in a variable temperature environment the concentration of salt crystals in a mixture of said crystals and a saturated solution of said salt, the density of said saturated solution increasing with the temperature of said mixture, said method comprising:

passing a beam of radiation through said mixture, detecting said radiation passing through said mixture to provide a first signal having a first component proportional to said salt crystals concentration and a second component proportional to said saturation solution density, sensing the temperature of said mixture to provide a second signal proportional to the density of said mixture, and combining said second signal with said first signal to provide a third signal proportional only to the concentration of said salt crystals in said mixture.

4. The method of regulating the concentration of salt crystals in a mixture of said crystals and a saturated solution of said salt crystals, the density of said saturated solution increasing with the temperature of said mixture, said method comprising the steps of:

passing a beam of radiation through said mixture, detecting said radiation passing through said mixture to provide a first signal having a first component proportional to said salt crystals concentration and a second component proportional to said saturation solution density, sensing the temperature of said mixture to provide a second signal proportional to the density of said mixture, and combining said second signal with said first signal to provide a third signal proportional only to the concentration of said salt crystals in said mixture, and controlling the temperature of said mixture in accordance with said third signal to maintain said crystal concentration substantially constant.

5. The method of determining in a variable temperature environment the solids concentration of a mixture of said solids in a saturated solution of said solids, the density of said mixture being a function of the density of said saturated solution and the concentration of said solids in said mixture, said method comprising the steps of:

measuring the density of said mixture, sensing the temperature of said saturated solution to measure the density thereof, and combining said density measurements to provide an indication of said solids concentration.

6. The method of determining in a variable temperature environment the solids concentration of a mixture of said solids in a saturated solution of said solids, the density of said mixture being a function of the density of said saturated solution and the concentration of said solids in said mxiture, said method comprising the steps of:

measuring the density of said mixture, sensing the temperature of said saturated solution to measure the density thereof, combining said density measurements to provide an indication of said solids concentration, and controlling the temperature of said mixture to maintain a predetermined concentratoin of said solids in said mixture.

7. The method of determining in a variable temperature environment the concentration of a crystalline material in a mixture of said crystals and a saturated solution of said material, the density of said mixture being a function of the density of said saturated solution and the concentration of said crystals in said mixture, said method comprising the steps of:

measuring the density of said mixture, sensing the temperature of said saturated solution to measure the density thereof, and combining said density measurements to provide an indication of said crystalline concentration.

8. The method of regulating in a variable temperature environment the concentration of a crystalline material in a mixture of said crystals and a saturated solution of said material, the density of said mixture being a function of the density of said saturated solution and the concentration of said crystals in said mixture, said method comprising the steps of:

measuring the density of said mixture, sensing the temperature of said saturated solution to measure the density thereof, combining said density measurements to provide an indication of said crystalline concentration, and controlling the temperature of said mixture to maintain said crystalline concentration substantially constant.

References Cited

UNITED STATES PATENTS

| 2,349,482 | 5/1944 | Welty | 73—53 |
| 2,362,661 | 11/1944 | Peters et al. | 73—452 |
| 2,898,466 | 8/1959 | Lintz et al. | 250—83.3 |
| 2,919,351 | 12/1959 | Swift | 250—83.6 |
| 2,968,727 | 1/1961 | Otis | 250—83.6 |
| 3,060,313 | 10/1962 | Ohmart et al. | 250—83.3 |

RICHARD C. QUEISSER, *Primary Examiner.*

J. FISHER, D. SCHNEIDER, *Assistant Examiners.*